INVENTOR
Louis A. Marzetta

United States Patent Office 2,871,432
Patented Jan. 27, 1959

2,871,432

AUTOMATIC TRACKING PROXIMITY GAGE

Louis A. Marzetta, West Hyattsville, Md., assignor to the United States of America as represented by the Secretary of Commerce Application August 9, 1956, Serial No. 603,201

8 Claims. (Cl. 318—31)

This invention relates to an automatic gage for tracking metallic objects and more particularly to a mutual inductance probe type gage for following the motion of an inaccessible or hidden small metallic object.

The present invention provides means whereby it is possible to accurately and automatically follow a small object without any physical contact between the object and the gage. The preferred form of the invention is particularly suited to the tracking of the metallic bead inside a conventional rotameter tube for the purpose of remotely indicating and recording a flow reading.

One object of the present invention is to provide improved means for remotely indicating the position of a small object.

Another object of this invention is to provide improved means for automatically tracking an inaccessible or hidden small metallic object.

A further object of this invention is to provide improved means for tracking a small object in which there is no physical contact between the tracking means and the object.

A still further object is to provide mutual inductance probe means for automatically indicating the position of a small hidden metallic object.

Other uses and advantages of the invention will become apparent upon reference to the specification and drawings.

Fig. 1A shows typical waveforms of the signals appearing at various points in the circuit of the diagram of Fig. 1;

Figure 1:
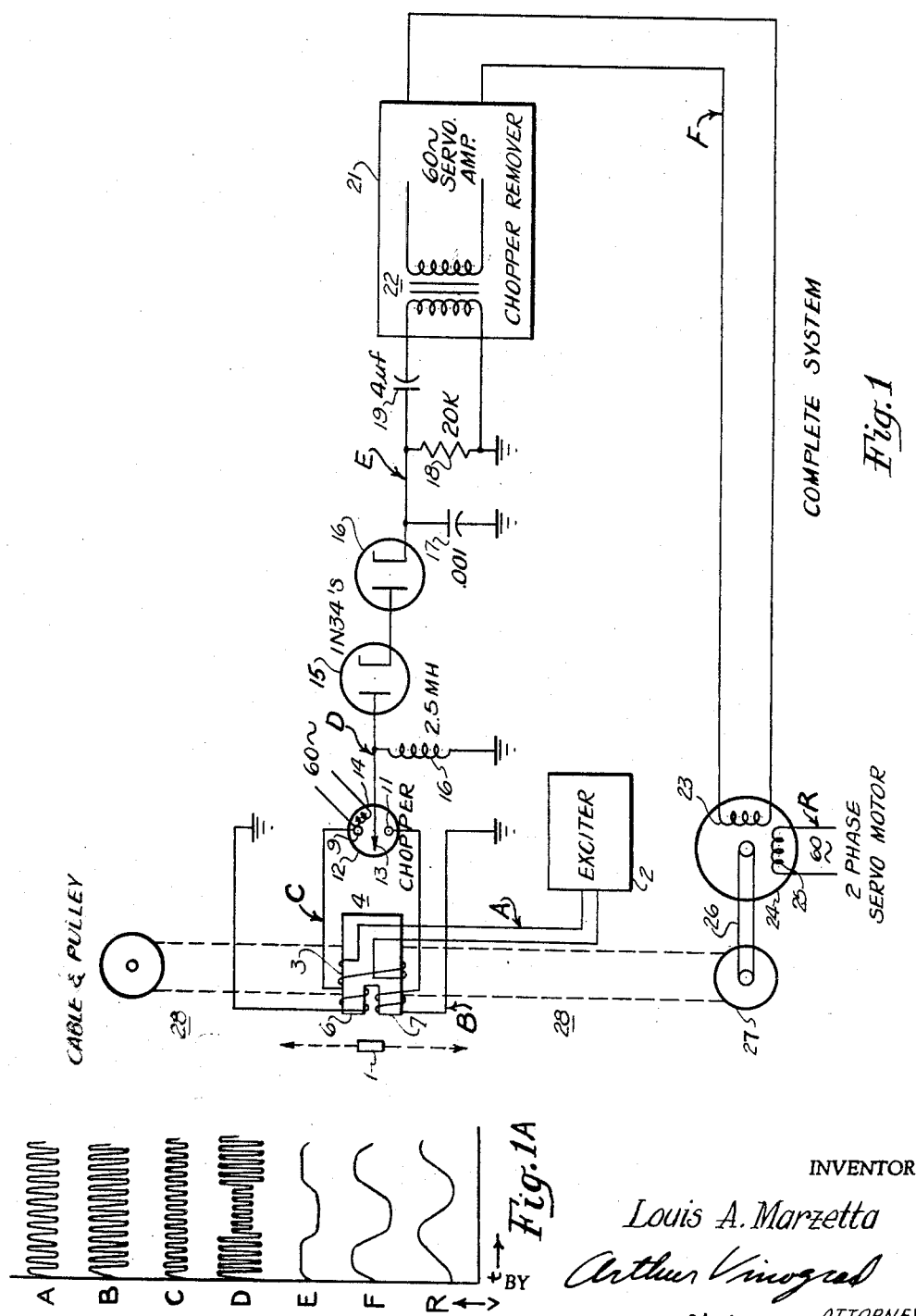
Fig. 1 shows an over-all diagram of the inductance probe tracking system of the present invention.

Referring to the drawings, in Fig. 1 is shown a small metallic object 1 experiencing random linear motion along the path indicated by the dashed arrows on the drawing. For example, object 1 might be the metallic bead inside a conventional glass rotameter tube (not shown). At 2 is an exciter source of A.-C. voltage for supplying electrical energy to the primary winding 3 of a probe indicated generally as 4. Secondary windings 6 and 7 are each connected at one end to ground and at the other end to opposing stationary contacts 9 and 11 of a chopper switch 12. A movable contact 13 of switch 12 is energized by a coil 14 supplied from a suitable 60-cycle line source. A choke coil 16 provides a D.-C. shunt path from contact 13 to ground.

In series with contact 13 are connected two detectors 15 and 16 followed by a low-pass filter consisting of capacitor 17 and resistor 18. A blocking capacitor 19 provides a small amount of phase shift to compensate for the time lag occasioned in chopper switch 12 by the mechanical inertia of movable contact 13.

At 21 is shown a conventional 60-cycle servoamplifier including an input transformer 22. An example of such a servoamplifier is shown in volume 21 of the M. I. T. Radiation Laboratory Series entitled, "Electronic Instruments," by Greenwood et al., 1948, page 441, Fig. 12.58. The output from 60-cycle servoamplifier 21 is fed to one winding 23 of a conventional two-phase servomotor 24. A second reference winding 25 of motor 24 is energized from a suitable reference supply preferably the same 60-cycle supply source as that feeding chopper 12.

Motor 24 is connected by a shaft 26 to a pulley 27 which forms the driving element of a pulley and cable system 28. Probe 4 may be secured to one of the cables of the system 28 by any suitable fastening means so as to move linearly alongside of object 1 in response to the mechanical output of servomotor 24.

The operation of the system of Fig. 1 is as follows:

Exciter source 2 supplies relatively high frequency electrical energy to probe 4, causing equal voltages to be induced in secondary windings 6 and 7. If object 1 is brought near the probe the mutual inductance between the common primary winding 3 and each of the secondary windings is a function of the distance of the object from each of the secondary windings. Therefore if the object is closer to one secondary than it is to the other, the mutual couplings will be different and the magnitude of the A.-C. voltage induced across one secondary will be greater than the voltage across the other.

These secondary voltages are alternatively sampled by chopper 12, the resulting signal being a successive series of A.-C. cycles of first one magnitude and then the other. The frequency of the A.-C. magnitude change occurs at the frequency of the chopper.

The output from the chopper 12 is passed through detectors 15 and 16 where the relatively high exciter frequency component is removed, leaving only the 60-cycle envelope representing the magnitudes of the probe secondary voltages.

This 60-cycle signal is filtered and amplified and passed to winding 23 of servomotor 24. If the input to winding 23 leads the signal in reference winding 25 by 90°, the shaft 26 will rotate in one direction, and, if the input lags by 90°, it will rotate in the other direction. Such a motor is well known in the art and no further discussion of it is necessary.

The windings 23 and 25 may be so wound that the shaft 26 turns in such a direction as to center the object 1 adjacent probe 4. At the center position the mutual couplings are equal, the probe secondary voltages are balanced, and no 60-cycle A.-C. signal is passed to winding 23. The position of probe 4 may be used visually or with any conventional metering or recording means as an indication of the instantaneous position of object 1.

Fig. 1A shows a voltage versus time plot of typical waveforms appearing at points labeled A through F and R in the circuit of Fig. 1. Curve A represents the high frequency source voltage from exciter 2. Curves B and C represent the increased and reduced magnitude signals resulting in the secondary windings 6 and 7 for a case in which the probe is not centered near object 1. Curve D indicates the output from chopper switch 12 while curve E shows the detected output of diodes 15 and 16 with the exciter frequency removed. Curve F is a plot of the amplified output of servoamplifier 21, which serves as the input to winding 23. The curve labeled R shows the reference voltage in winding 25. All waveforms are shown over 1½ cycles of the 60 cycle chopper frequency. The 90° phase shift between the chopper voltage and the signal in reference winding 25 may be obtained by any suitable means in either circuit.

Figure 2:
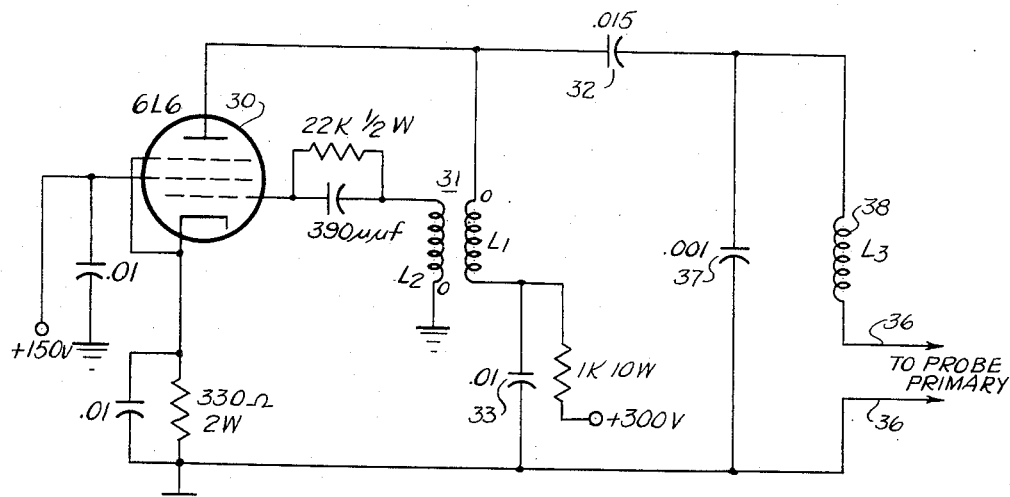
Fig. 2 shows a circuit diagram of the probe primary winding exciter source of Fig. 1.

In Fig. 2 is shown the circuit diagram for the exciter source 2 of Fig. 1. Tube 30 is a pentode type oscillator tube having conventional screen grid supply and cathode bias. Positive feedback is from the plate to the control grid through transformer 31. The circuit preferably operates at about 2.5 megacycles and includes blocking capacitors 32 and 33 and a 300-volt plate supply. The output from the oscillator is taken across leads 36, which contain the circulating current of the tank circuit formed by capacitor 37 and inductor 38. This particular arrangement provides a relatively simple means for obtaining a large driving current for the primary winding of probe 4.

Figure 3:
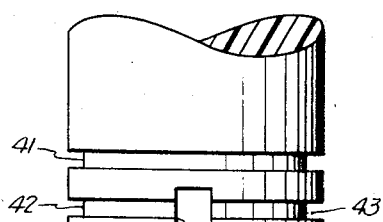
Figs. 3 and 4 show side and end views respectively of the probe core.
Figure 4:
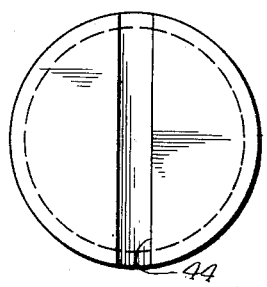

Figs. 3 and 4 show the shape of the core of probe 4. An annular slot 41 adapted to receive the primary probe winding is formed in the Bakelite core and has a width of approximately $1/16$ inch as do the semicircular slots 42 and 43 adapted to receive the two secondary windings. A groove 44 approximately $1/8$ inch in width separates the legs upon which slots 42 and 43 are formed.

Figure 5:
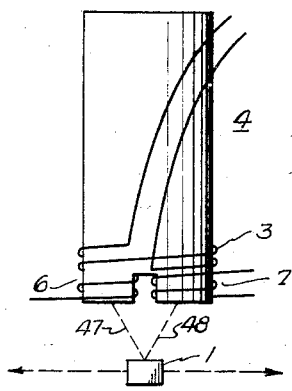
Fig. 5 shows the position of the probe with respect to the object being tracked.

Fig. 5 illustrates the unbalance action brought about by linear displacement of object 1. Dotted lines 47 and 48 represent the distances from each secondary winding to the object, which distances affect the mutual coupling between the primary winding and each secondary winding. As can be seen from Fig. 5 these distances are equal only when the extended center line of probe 4 bisects the object 1.

The device of the present invention will function with both magnetic and nonmagnetic metallic objects. The size of the object to be followed can be a small pea-sized piece of solid metal or a hollow object with a wall thickness of less than 0.001 inch. If the object is long with respect to its width the gage will track it with the extended center line of the gage bisecting the object. The dead zone of detectable motion is under 0.005 inch. A slight repulsion force is exerted on the metallic object due to induced eddy currents but is negligible, ordinarily being less than ten dynes. The gage will operate and "see" through air, glass, water, vacuum, or any opaque dielectric medium with equal facility. It is possible to track the object at any distance up to $1/2$ inch.

It will be apparent that the embodiments shown are only exemplary and that various modifications can be made in construction and arrangement within the scope of the invention as defined in the appended claims.

What is claimed is:

1. A gage for tracking metallic objects comprising an inductive probe having two secondary windings and a common primary winding movably secured adjacent to an object to be tracked, exciting means coupled to said primary winding, means including sampling means coupled to said probe for obtaining an alternating electrical signal, each alternate half cycle of which is proportional to the induced voltage on one of each of said secondary windings, electrical means coupled to said signal obtaining means for comparing the magnitude and phase of each half cycle of said signal, and mechanical means responsive to said electrical comparing means for displacing said probe in proportion to the output of said electrical comparing means.

2. A gage for tracking small metallic objects comprising an inductive probe having two secondary windings and a common primary winding movably secured adjacent to an object to be tracked, electrical exciting means coupled to said primary winding, switch means for alternately sampling the induced signal on each of said secondary windings, detecting means coupled to said switch means for obtaining an alternating signal each alternate half cycle of which is proportional to one of said induced secondary signals, electrical means coupled to said detecting means for comparing the magnitude and phase of each half cycle of said alternating signal, and mechanical means responsive to said electrical comparing means for displacing said probe in proportion to the output of said comparing means.

3. A gage for tracking small metallic objects comprising an inductive probe having spaced secondary windings and a common primary winding movably positioned on support means adjacent to an object to be tracked, exciting means for said primary winding, chopper means coupled to said secondary windings for alternately sampling the induced signal on each of said secondary windings, detecting means coupled to said chopper means for obtaining an alternating signal of the frequency of said chopper means each alternate half cycle of which is proportional to the induced signal on one of each of said secondary windings, electrical means coupled to said detector means for comparing the magnitude and phase of each half cycle of said chopper frequency signal, and mechanical means responsive to said electrical comparing means for displacing said probe in proportion to the output of said comparing means.

4. A gage for tracking small metallic objects comprising inductive probe means having separate spaced secondary windings and a common primary winding movably positioned on support means adjacent to an object to be tracked, exciting means coupled to said primary winding, alternating switch means coupled to said secondary windings for successively sampling the induced signal on each of said secondary windings, detecting means coupled to said switch means for detecting the output signal from said switch means, servomotor means coupled to said detector means for comparing the phase and amplitude of each half cycle of said detected signal with reference signal and mechanical means responsive to said servomotor output for displacing said probe means in proportion to the difference between said half cycles of said detected signal.

5. A gage as defined in claim 4 in which the energization for said alternating switch means and said reference signal are derived from the same source.

6. A gage for tracking small metallic objects comprising an inductive probe having two separate spaced secondary windings and a common primary winding movably positioned on support means adjacent to a metallic object to be tracked, exciting means coupled to said primary winding, chopper means coupled to said secondary windings for successively sampling the induced voltages on said secondary windings, detecting means coupled to said chopper means for obtaining a signal representative of the envelope of said sampled voltages, two phase servomotor means coupled to said detecting means for comparing the phase and magnitude of said envelope signal with the phase and magnitude of a reference signal and mechanical means responsive to the output of said servomotor comparing means for moving said probe along said support means in accordance with the position of said metallic object.

7. A gage as defined in claim 6 which the frequency of said chopper means and said reference signal is the same.

8. A gage as defined in claim 7 in which said chopper means is energized from the source for said reference signal.

References Cited in the file of this patent

UNITED STATES PATENTS

| | | |
|---|---|---|
| 2,367,349 | Harrison | Jan. 16, 1945 |
| 2,423,540 | Wills | July 8, 1947 |
| 2,476,496 | Kliever | July 19, 1949 |
| 2,517,556 | Goertz | Aug. 8, 1950 |